April 6, 1965 R. G. GABRIEL ETAL 3,176,439
MACHINE TOOL WORKPIECE SUPPORT
Filed Dec. 21, 1962 4 Sheets—Sheet 1

INVENTORS
ROBERT G. GABRIEL
JASON R. LEMON
BY
*Howard A. Keiser*
*John F. Verhoeven*
ATTORNEYS

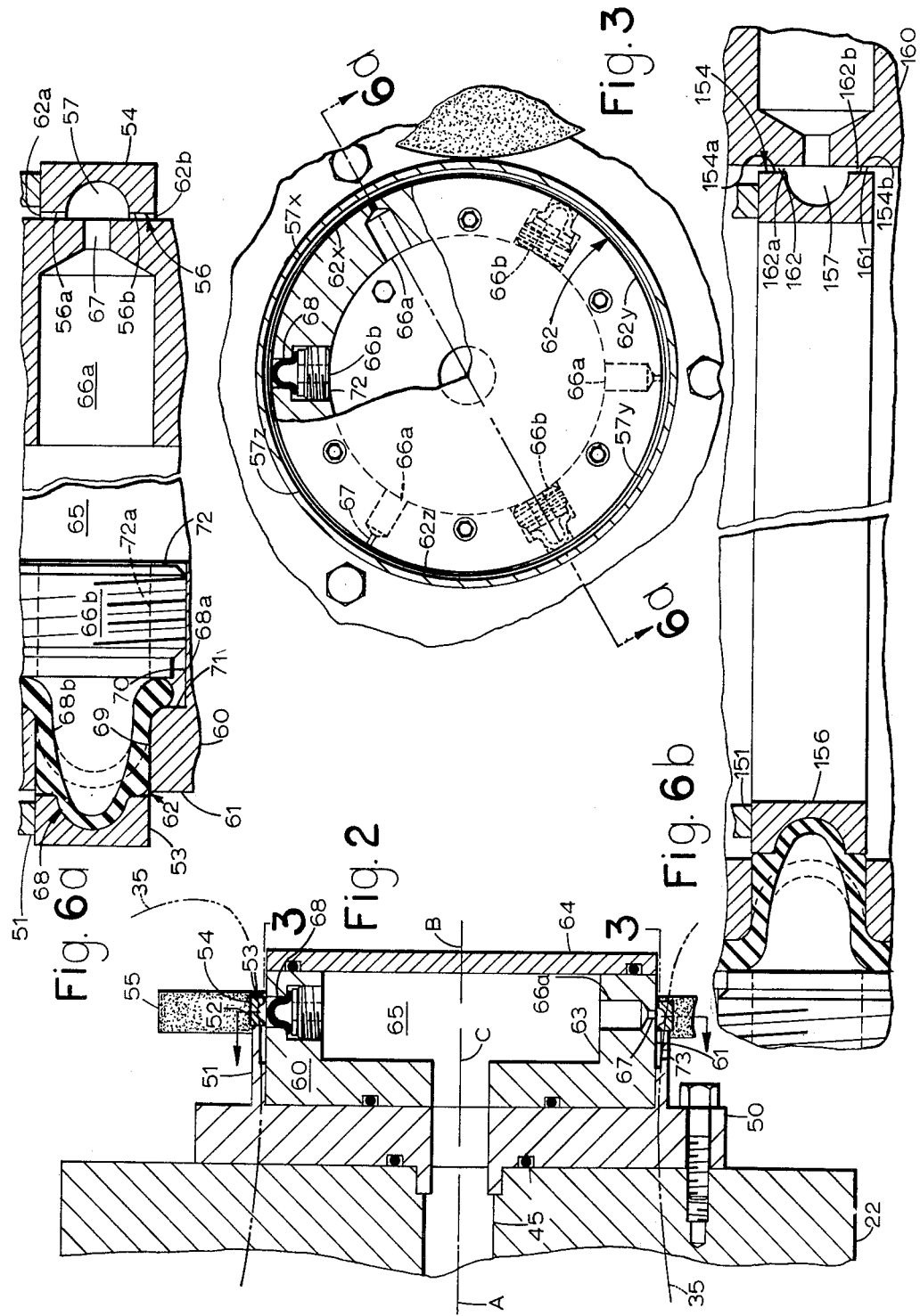

April 6, 1965 R. G. GABRIEL ETAL 3,176,439
MACHINE TOOL WORKPIECE SUPPORT
Filed Dec. 21, 1962 4 Sheets-Sheet 3

# United States Patent Office 3,176,439
Patented Apr. 6, 1965

3,176,439
MACHINE TOOL WORKPIECE SUPPORT
Robert G. Gabriel, Cincinnati, and Jason R. Lemon, Milford, Ohio, assignors to The Cincinnati Milling Machine Co., Cincinnati, Ohio, a corporation of Ohio
Filed Dec. 21, 1962, Ser. No. 246,494
13 Claims. (Cl. 51—237)

The present invention relates to a machine tool workpiece support, and, more specifically, to structure to support a workpiece by fluid pressure forces for rotation of the workpiece for a machining operation thereon. The structure of the present invention is particularly suitable for the support and rotation of an annular workpiece having a groove in one peripheral surface for a grinding operation on the other peripheral surface thereof.

In the copending patent application of William B. Seidel, Serial Number 230,365, filed October 15, 1962 and assigned to the same assignee as the present invention, there is disclosed a chuck to support and rotate an annular workpiece for a machining operation on one peripheral surface of the workpiece. Fluid pressure forces are utilized in supporting the workpiece during grinding against the lateral force of the grinding wheel to avoid the distortion of the annular workpiece which can arise when the lateral grinding force is resisted by rigid supports engaging the workpiece. A support surface of the chuck, which is centric with respect to the axis of rotation of the chuck, encircles the peripheral surface of the workpiece not being ground and defines a small annular gap therewith which is of equal radial span around the workpiece when the workpiece is centered with respect to the support surface and the axis of rotation of the chuck. The annular gap constitutes a restriction to the flow of fluid, and when fluid under pressure is discharged from openings around the support surface into the gap, fluid pressure forces are produced around the workpiece which are balanced when the workpiece is centered with respect to the support surface (because the gap is of equal radial span around the workpiece) but which are unbalanced when the workpiece is off-center with respect to said support surface (because the radial span of the gap varies around the workpiece). If the workpiece is off-center with respect to the support surface, the unbalanced fluid pressure forces around the workpiece (which result from a high pressure area on one side of the workpiece, a low pressure area on the opposite side of the workpiece, and intermediate pressure areas therebetween) define a pressure force differential which urges the workpiece to a desired centered position with respect to said support surface.

Generally, the gap between the workpiece and the support surface provides sufficient resistance to the circumferential flow of fluid around the workpiece so that a differential pressure force can develop when the workpiece is off-center with respect to the support surface. However, any circumferential flow of fluid from the high pressure area to the low pressure area occurring when the workpiece is off-center with respect to the support surface results in a smaller pressure differential and diminishes the tendency of the workpiece to center with respect to the support surface. It is therefore a general object of the present invention to provide a fluid pressure type support for a workpiece in which circumferential fluid flow around the workpiece from a high pressure area to a low pressure area, when the workpiece is displaced from a predetermined desired position, is prevented.

The problem of developing a pressure differential around the workpiece is particularly acute with certain shaped workpieces. For example, if an annular workpiece which is to have one peripheral surface ground, has a groove in the other peripheral surface (which is the surface to which the fluid supporting forces are applied to avoid interference with the grind) the groove will offer virtually no resistance to circumferential fluid flow. Without resistance to circumferential fluid flow, no pressure differential can develop around the workpiece when the workpiece is displaced from a centered position relative to the support surface, even when displaced to an extreme off-center position with the lands on either side of the groove in contact at one point with the support surface. Under these conditions, there will be no tendency for the workpiece to shift to the desired centered position. It is therefore another object of the present invention to provide a fluid pressure type chuck which will support an annular workpiece having a groove in one peripheral surface for a machining operation on the other peripheral surface thereof.

In brief, in the present invention, barriers extend from the support surface at angularly spaced points into engagement with the workpiece to impede circumferential fluid flow from a high pressure area on one side of the workpiece to a low pressure area on the other side thereof. If there is a groove in the workpiece surface to be supported, these barriers extend into the groove to define, between the barriers, a plurality of pockets around the workpiece. Fluid is supplied to these pockets from openings in the support to produce fluid pressure forces around the workpiece. Because these barriers prevent circumferential fluid flow around the workpiece from a high pressure area to a low pressure area, a fluid pressure force differential is developed when the workpiece is displaced to an off-center position with respect to the support surface, and this pressure force differential urges the workpiece back to the desired centered position.

In the preferred form of the invention, the barriers are defined by elastic diaphragms which are mounted in radial fluids passages in the support. When no fluid under pressure is supplied to the diaphragm passages, the diaphragms are in their relaxed condition inside the support to facilitate loading and unloading of the workpieces. With a workpiece in the support, air under pressure is supplied to the diaphragm passages causing the diaphragms to extend from the support surface into contact with a workpiece in the support. The extended diaphragms are yieldable and remain in contact with the workpiece despite any shifting of the workpiece relative to the support.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 2 is a greatly enlarged view, in cross-section taken as the view of FIG. 1, of the forward end of a chuck suitable for supporting a workpiece for a grind on the external surface thereof;

FIG. 3 is a view taken on the line 3—3 of FIG. 2, with a portion broken away for clarity;

FIG. 6a is an enlarged view taken on the line 6a—6a of FIG. 3;

FIG. 6b is an enlarged view taken on the line 6b—6b of FIG. 5;

Figure 7C:
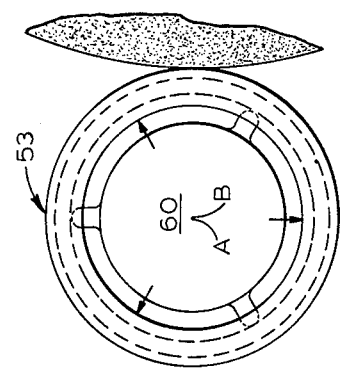
Figure 8C:
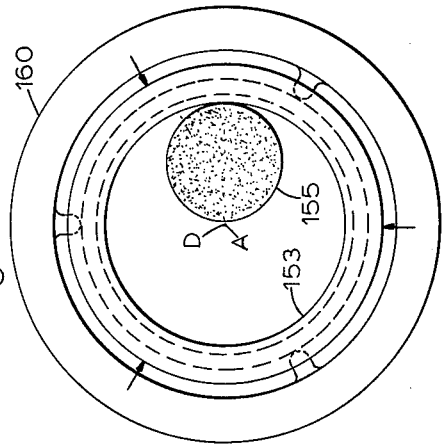
Figure 7B:
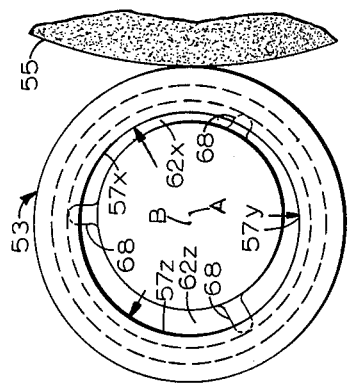
Figure 8B:
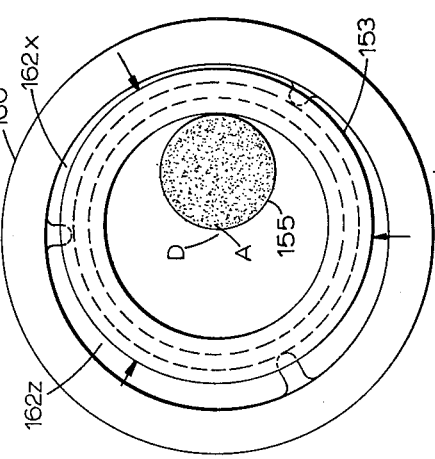
Figure 7A:
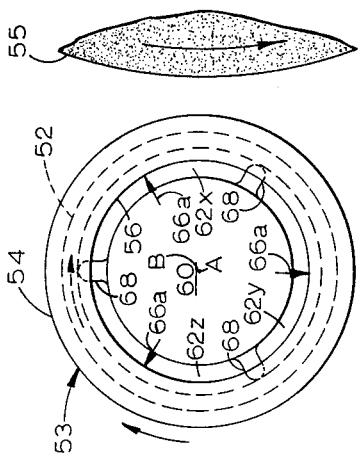
Figure 8A:
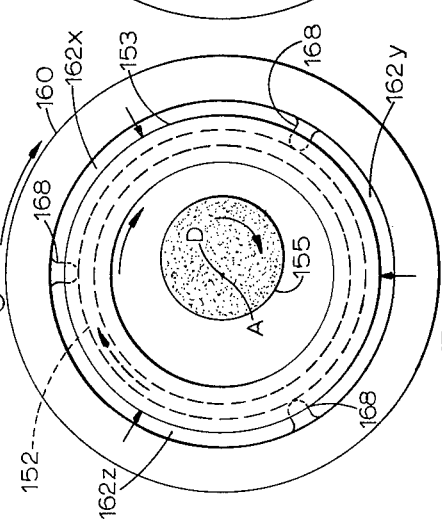

FIGS. 7a, 7b, and 7c are views of a workpiece supported for an external grind before the grinding wheel contacts the workpiece, during the grind, and at the end of the grind, respectively; the gap between the workpiece and the support being greatly exaggerated for clarity;

FIGS. 8a, 8b, and 8c are views of a workpiece supported for an internal grind before the grinding wheel contacts the workpiece, during the grind, and at the end of the grind, respectively, the gap between the workpiece and the support being greatly exaggerated for clarity.

Figure 1:
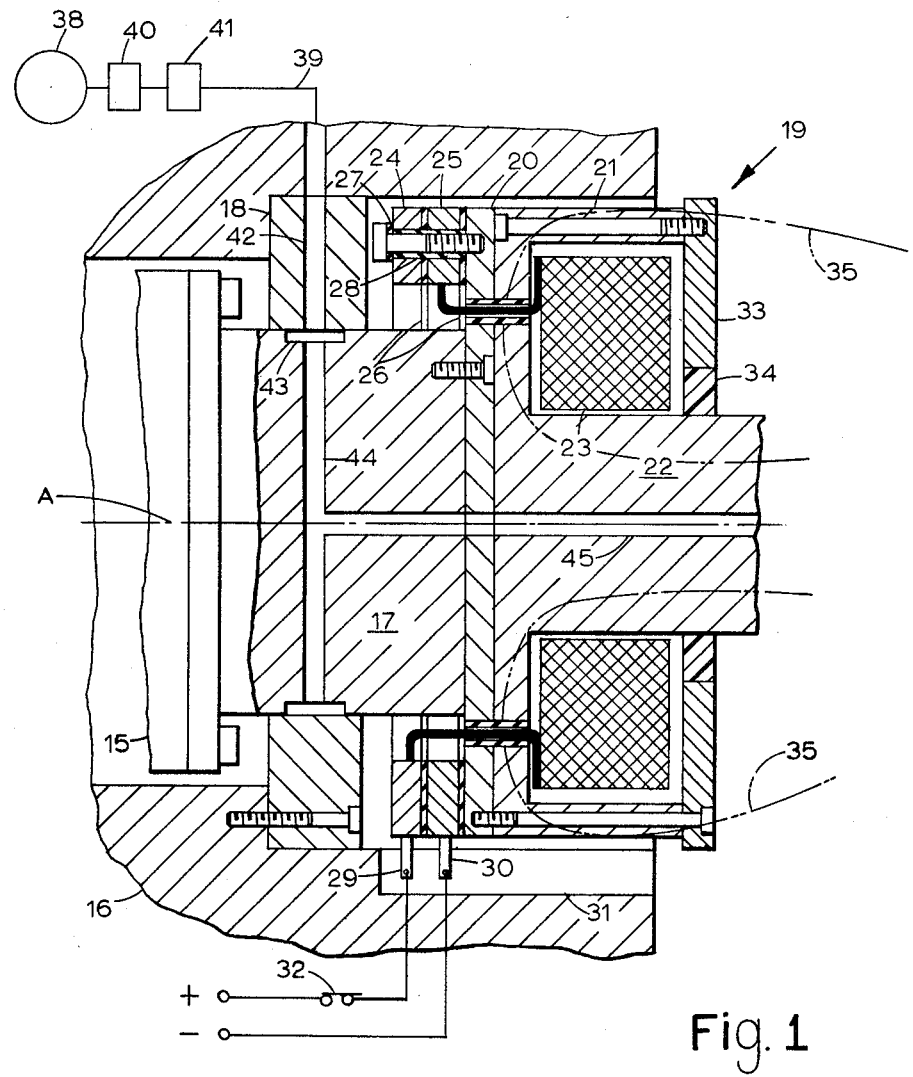
FIG. 1 is a view, partly in cross-section, of a grinding machine spindle with a magnetic chuck mounted on the forward end thereof.

There is shown in FIG. 1 a spindle 15 which is mounted for rotation about axis A in the headstock 16 of a grinding machine. The spindle 15 has a front nose piece 17 rotatably received in and extending through a fluid distributor ring 18 secured in the headstock. A magnetic chuck, indicated generally at 19, has a rear plate 20 secured to the forward end of the nose piece 17. Plate 20 has connected thereto a cup shaped electromagnet member 21 which has a central forwardly extending pole piece 22. A coil 23 encircling pole piece 22 is electrically connected to two commutator rings 24, 25 mounted in stacked relation on the back of plate 20. The two rings 24, 25 (which are electrically insulated from each other and from plate 20 by insulating gaskets 26, insulating washers 27, and insulating bushings 28) are in electrical contact, respectively, with brushes 29, 30 mounted in slot 31 in the housing. When switch 32 is closed, the pole piece 22 of the rotating chuck is magnetized. The pole piece 22 extends through a cover plate 33 connected to the forward end of member 21. Plate 33 has a ring 34 of non-magnetic material surrounding the pole piece 22 to minimize the diversion of flux from a flux path 35 through the forward end of the pole piece.

A source 38 of fluid under pressure, such as air, is connected by line 39, which contains shutoff valve 40 and pressure regulating valve 41, to a radial fluid passage 42 in fluid distributor ring 18. Passage 42 is in continuous communication with annular groove 43 of the rotating spindle nose piece 17. Groove 43 is connected by radial fluid passages 44 to a central fluid passage 45 extending forwardly through the nose piece 17, plate 20, and pole piece 22.

As shown in FIG. 2, a workpiece driver member 50 is secured to the front end of pole piece 22. Member 50 has a forwardly extending flange portion 51 terminating at a forward annular workpiece driving face plate 52 which is centric with respect to axis A and which lies in a plane normal to the axis A. The driving member 50 is made of magnetic material, and the annular face plate 52 thereof defines an abutment surface which slidably grips one end of annular workpiece 53 for rotation thereof during the grinding of the outer peripheral surface 54 by the rotatable grinding wheel 55. The workpiece has a central longitudinal axis B (normal to the end surfaces) and, as shown best in FIG. 6a, the inner peripheral surface 56 of the workpiece has a central groove 57 extending circumferentially completely around the workpiece and defining two inner end lands 56a, 56b, spaced apart in the axial direction.

A cylindrical stud 60 having a central longitudinal axis C is connected to the front of driver member 50 in centric relation thereto (that is, with axis C coincident with axis A). Stud 60, which defines a support member for the workpiece, is made of non-magnetic material, such as stainless steel, to minimize diversion of flux from the flux path 35 which passes through the pole piece 22, driving member 50, and the workpiece 53. The outer surface 61 of stud 60 defines a support surface of circular cross-section (centric with respect to axes A and C) which has a smaller diameter than the diameter of the inner peripheral workpiece surface 56 (or, more specifically, the lands 56a, 56b thereof). The clearance between the stud surface 61 and the inner peripheral surface of the workpiece constitutes an annular gap 62 which is of equal radial span all around the stud and workpiece when the workpiece is centric with respect to the stud (that is, when axis B is coincident with axes A and C). The gap 62 is divided by groove 57 into a rear axial extending gap section 62a (defined by the stud surface 61 and land 56a on the workpiece) and a forward axial extending gap section 62b (defined by the stud surface 61 and land 56b on the workpiece).

The stud 60 has a central bore 63 terminating short of the rear face of the stud and closed at the front by cover plate 64 to define a cavity 65. Fluid passage 45 extends through driving member 50 and the rear of stud 60 to supply air under pressure to cavity 65. Stud 60 has a plurality of radial passages extending between cavity 65 and support surface 61. Some of these radial passages (identified as 66a) are constrictive, as at 67, to define resistance to the flow of air therethrough, and other of these radial passages (identified as 66b) receive diaphragms 68 therein which completely close the passages 66b. The radial passages in the stud 60 are equally angularly spaced with every other radial passage constituting a constrictive passage 66a and alternate radial passages constituting a diaphragm passage 66b.

Each passage 66b comprises two coaxial bores, the outer bore 69 being smaller than the inner bore 70 to define a shoulder 71. The diaphragm 68 has an inner flange 68a which is clamped between shoulder 71 and a screw 72 threadedly received in bore 70. The diaphragm has a body portion 68b of generally hemispherical conformation which is integral with the flange 68a and extends outwardly therefrom into bore 69. The inside of the diaphragm is in continuous communication with cavity 65 through a passage 72a in screw 72. When the supply of air under pressure to cavity 65 is blocked by shutoff valve 40, each diaphragm assumes its relaxed condition (shown in FIG. 3 and indicated in dotted lines in FIG. 6a) and does not extend beyond support surface 61 so that the workpiece 53 may be mounted on and removed from stud 60 without interference with the diaphragms. When shutoff valve 40 is opened and air under pressure is supplied to stud cavity 65, each diaphragm is extended beyond support surface 61 and into groove 57 in the workpiece 53 (as shown in solid lines in FIG. 6a). In its extended position, each diaphragm engages the bottom and sides of the groove 57 and constitutes a barrier to circumferential fluid flow in the groove. The three diaphragms shown in FIG. 3, when extended as shown in FIG 6a, divide the gap 62 into three circumferentially extending discrete gap portions 62x, 62y, 62z of equal circumferential span. The diaphragms also divide the groove into three circumferentially extending discrete pockets 57x, 57y, 57z of equal circumferential span, each in communication with one of the passages 66a. It will be noted that the three diaphragms are all of the same size and since the same pressure (in cavity 65) is utilized to extend them all, they all exert equal forces on the workpiece. Since these forces all act outwardly at equally spaced apart angles, they cancel each other and produce a net force on the workpiece of zero.

Fluid under pressure discharged from cavity 65 through the constrictive passages 66a (which define a fixed resistance to flow) flows into each pocket 57x, 57y, 57z and escapes from each pocket through the gap sections 62a and 62b. A plurality of radial passages 73 through driver flange 51 permits the escape to atmosphere of fluid flowing through gap section 62a. If fluid were free to flow circumferentially in groove 57, the pressure in all the pockets would, at any given instant, be the same. The diaphragms 58, however, when extended, constitute barriers to circumferential fluid flow, and different pressures can be established at any instant in the pockets 57x, 57y, and 57z defined by the groove and the extended diaphragms. The pressure in any one of the discrete pressure zones defined by the separate pockets will depend on the rate at which fluid can escape from the pocket through the gap sections 62a, 62b. This rate, in turn, depends on the radial span of these gap sections. The greater the gap span, the lower the pressure in the pocket and the smaller the gap span, the greater the pressure in the pocket. When the workpiece 53 is centered with respect to the stud 60, the radial span of the gap 62 is the same all around the workpiece and identical pressures develop in the pockets 57x, 57y, and 57z. These pressures produce forces acting radially outwardly on the inner peripheral surface of the workpiece, and, since the pockets are of equal circumferential span, these forces are substantially in balance. If, however, the workpiece is off-center with respect to the stud 60, the radial span of the gap 62 differs around the workpiece and different pressures develop in the pockets. These different pressures produce a net resultant fluid pressure force on the workpiece tending to center the workpiece with respect to the stud.

Initially, the workpiece 53 is mounted on the stud before valve 40 is opened, and when that valve is opened, the diaphragms extend into engagement with the workpiece groove 57 as shown schematically in FIG. 7a. Air discharging from cavity 65 produces pressures in the pockets which create forces centering the workpiece. Although the force created in any one pocket is distributed circumferentially over the entire pocket, it is shown schematically as a resultant force acting at the center of the pocket and indicated by a radial arrow. The workpiece 53, although slidable laterally on the face plate 52, is gripped thereby with sufficient force to rotate the workpiece as the chuck 19, face plate 52, and stud 60 are rotated by spindle 15. When, subsequently, the grinding wheel 55 is fed into the workpiece, as shown schematically in FIG. 7b, a grinding force (the magnitude of which depends on the feed rate) is produced on the workpiece which displaces the workpiece to the left. This decreases the radial span of gap portion 62x at pocket 57x and increases the radial span of gap portion 62z at pocket 57z. The diaphragms 68 remain in engagement with groove 57 and the pressure in pocket 57x increases while the pressure in pocket 57z decreases. Thus, a fluid pressure differential force is produced on the workpiece urging the workpiece to the right in opposition to the grinding force. As the feed movement diminishes, and eventually stops, the grinding force diminishes, and the workpiece is moved back to the centric position with respect to stud 60, as shown in FIG. 7c.

The structure shown in FIGS. 2, 3, 6a, 7a, 7b, and 7c is designed to support the inner peripheral surface of an annular workpiece for a grind on the outer peripheral surface thereof. There is shown in FIGS. 4, 5, 6b, 8a, 8b, and 8c structure for supporting the outer peripheral surface of an annular workpiece for a grind on the inner peripheral surface thereof.

Figure 4:
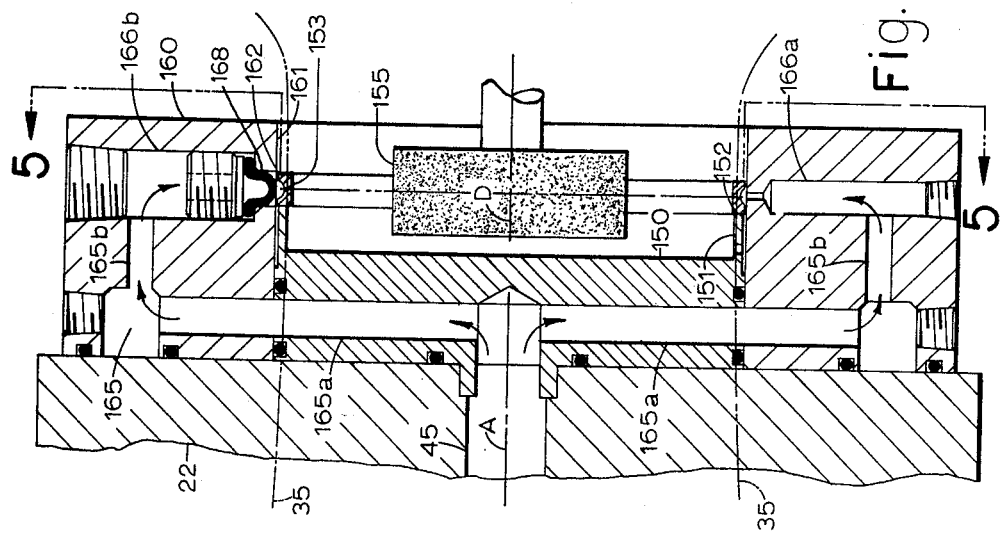
FIG. 4 is a view corresponding to the view of FIG. 2 but showing the forward end of a chuck suitable for supporting a workpiece for a grind on the internal surface thereof.

As shown in FIG. 4, a workpiece driver member 150 is secured to the front end of the magnet pole piece 22 and has a forwardly extending flange portion 151 terminating at a forward annular workpiece driving face plate 152. Face plate 152 is centric relative to axis A and defines an abutment surface which slidably grips one end of the workpiece 153 for rotation thereof in the plane of the grinding wheel 155. The workpiece has a central longitudinal axis D, an inner peripheral surface 156 which is to be ground, and an outer peripheral surface 154. Surface 154 has a central circumferential groove 157 extending completely around the workpiece to define two end lands 154a, 154b.

An annular rim 160 of non-magnetic material is connected to the front of pole piece 22 around driving member 150 and centric relative thereto. The rim extends over workpiece abutting face plate 152 with clearance between the inner support surface 161 of the rim and the outer peripheral surface 154 of a workpiece mounted centrally on the face plate to define a gap 162 therebetween. The gap 162 is divided by groove 157 into a rear axial extending section 162a (defined by rim surface 161 and land 154a on the workpiece) and a forward axial extending gap section 162b (defined by rim surface 161 and land 154b on the workpiece).

Radial passages 165a emanating from fluid passage 45 extend through driving member 150 to an annular cavity 165 in the rim 160. Equally angularly spaced alternate radial passages 166a and 166b in the forward end of the rim member, which terminate at the support surface 161, are in communication with cavity 165 through passages 165b. The radial passages 166a are constrictive, as the radial passages 66a of FIGS. 2, 3, 6a, and the radial passages 166b contain diaphragms 168 which are shaped and mounted like the diaphragms 68 of FIGS. 2, 3, and 6a. The three diaphragms shown in FIG. 5, when extended as shown in solid lines in FIG. 6b, divide the gap 162 into three circumferentially extending discrete gap portions 162x, 162y, 162z, and divide the groove into three circumferentially extending discrete pockets 157x, 157y, 157z, of equal circumferential span.

Figure 5:
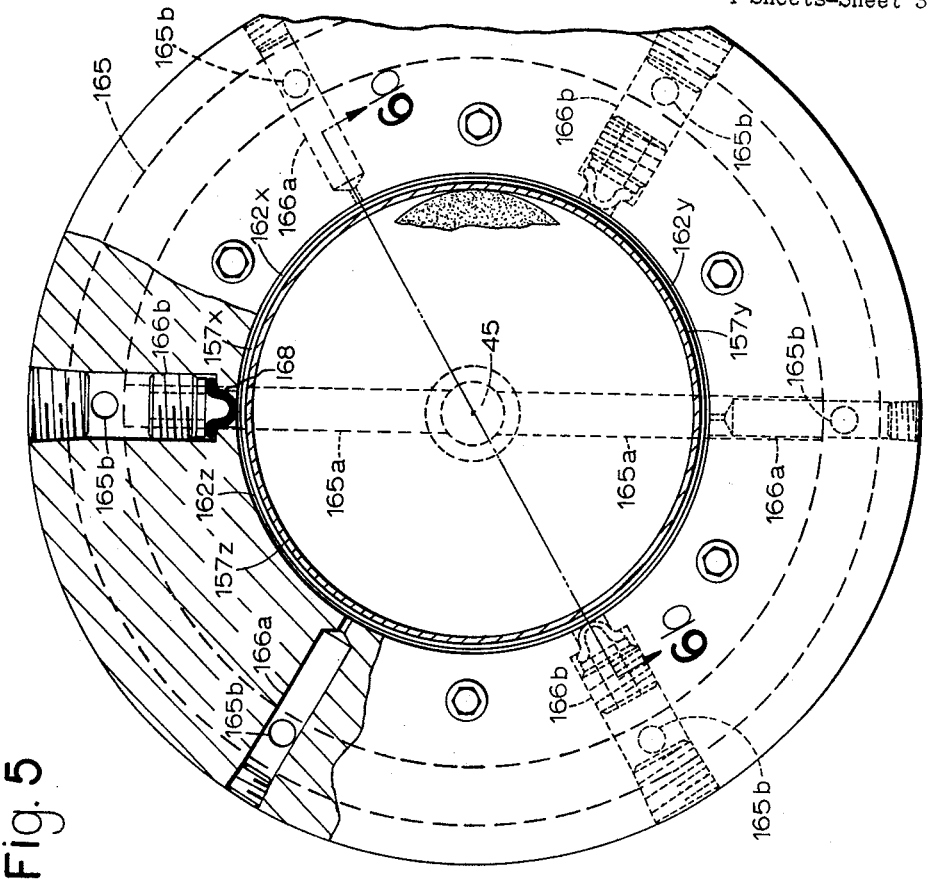
FIG. 5 is a view taken on the line 5—5 of FIG. 4.

The workpiece is mounted within the rim 160, and against abutment face plate 152, when valve 40 is closed and the diaphragms are relaxed and within the rim 160, as shown in FIG. 5 and in dotted lines in FIG. 6b. The magnetic face plate 152 and rim 160 rotate with the spindle to rotate the workpiece. When valve 40 is opened, air under pressure is supplied to passages 166a and 166b to extend the diaphragms and center the workpiece with respect to the rim as shown schematically in FIG. 8a. When the workpiece is displaced from centric relation with the rim, as shown in FIG. 8b, the diaphragms remain engaged with the workpiece and permit different pressures to develop in the pockets. With different pressures established in the pockets, a fluid pressure force differential is produced urging the workpiece back to centric relation with the rim. Subsequently, as the grinding force diminishes, the workpiece moves back toward a central position, as shown in FIG. 8c.

What is claimed is:

1. In a workpiece support having a support surface to encircle with clearance the peripheral surface of a workpiece in registration with the support surface, said support surface having angularly spaced openings therein for the discharge of fluid under pressure, the combination therewith of a plurality of barriers carried by said support for engagement with said peripheral surface of the workpiece to impede circumferential fluid flow around the workpiece.

2. In a workpiece support adapted for connection to a source of fluid under pressure, the combination comprising a support surface to encircle with clearance a peripheral surface of circular cross-section of a workpiece carried by the support to define therewith a gap around said peripheral surface, said support surface circular in cross-section about a central axis and having a plurality of openings therein connected with said source of fluid under pressure, a plurality of barriers mounted in said support for yieldable engagement with said peripheral surface of the workpiece to divide said gap into a plurality of discrete portions of equal circumferential span around said central axis, each of said gap portions in communication with at least one of said openings in the support surface for the application of fluid pressure around the peripheral surface of the workpiece to center the workpiece with respect to said central axis.

3. For a workpiece having a central longitudinal axis and having a peripheral surface of circular cross-section with an annular groove between axially spaced lands, a workpiece support having a longitudinal axis and having an abutment surface normal to said support axis to receive one end of the workpiece thereagainst, said support having a support surface in registration with said peripheral surface of a workpiece engaged with said abutment surface, said support surface defining in cross-section a circle having a center on said support axis and providing clearance with the lands on the peripheral workpiece surface in registration therewith, said clearance of equal radial span around the workpiece when the central axis of the workpiece is aligned with the longitudinal axis of the support, said support having a plurality of fluid passages terminating at angularly spaced openings in said support surface for discharge of fluid into the annular groove on the peripheral surface of a workpiece, and a plurality of barriers mounted in said support and extendable from said surface into said workpiece groove for yieldable engagement with the workpiece at equally angularly spaced points about said support axis to divide the annular groove into a plurality of pockets of equal circumferential span around said support axis, each of said pockets in communication with at least one of said openings in the support surface for the application of fluid pressure around the peripheral surface of the workpiece to center the workpiece with respect to said support axis.

4. For a workpiece having a central longitudinal axis and having a peripheral surface of circular cross-section with an annular groove between axially spaced lands, a workpiece support having a longitudinal axis and having an abutment surface normal to said support axis to receive one end of the workpiece thereagainst, said support having a support surface in registration with said peripheral surface of a workpiece engaged with said abutment surface, said support surface defining in cross-section a circle having a center on said support axis and having a diameter of a size to provide clearance with the lands on the peripheral workpiece surface in registration therewith, said clearance of equal radial span around the workpiece when the central axis of the workpiece is aligned with the longitudinal axis of the support, said support having a plurality of fluid passages terminating at openings in the support surface, some of said openings equally angularly spaced about said support axis and having flexible diaphragms therein, said diaphragms extendable upon the application of fluid pressure thereto into said workpiece groove for yieldable engagement with the workpiece, said diaphragms when extended dividing the annular groove into discrete fluid pressure pockets each in communication with at least one of the other of said openings, said pockets of equal circumferential span around said support axis for the application of fluid pressure around the peripheral surface of the workpiece to urge the workpiece to a centered position with respect to said support axis.

5. For an annular workpiece having a central longitudinal axis and having one peripheral surface to be operated on, said workpiece having an annular groove between axially spaced lands on the other peripheral surface thereof, a rotatable machine tool workpiece support having a longitudinal axis and having a magnetic face plate normal to said axis to slidably hold one end of the workpiece thereagainst, said support having a support surface in registration with said other peripheral surface of a workpiece held against the face plate, said support surface defining in cross-section a circle having a center on said support axis and having a diameter of a size to provide clearance with the lands on said other peripheral workpiece surface in registration therewith, said clearance of equal radial span around the workpiece when the central axis of the workpiece is aligned with the longitudinal axis of the support, said support having a plurality of radial fluid passages therein, some of said radial passages equally angularly spaced about said support axis and having an elastic diaphragm therein and the other of said passages constrictive to define resistance to fluid flow, said diaphragms extendable upon the application of fluid pressure to the diaphragm passages into said workpiece groove for yieldably engagement with the workpiece, said diaphragms when extended dividing the annular groove into discrete pockets of equal circumferential span around said support axis, each of said pockets in communication with at least one of said other openings in the support surface for the application of fluid pressure around the peripheral surface of the workpiece to center the workpiece with respect to said support axis.

6. In a support to carry an annular workpiece for a machining operation on the external peripheral surface thereof, an abutment surface to engage one end of the workpiece, a support surface in registration with a workpiece engaged with said abutment surface and encircling with clearance the inner peripheral surface of said workpiece, said support surface having a plurality of angularly spaced openings therein for the discharge of fluid under pressure, and a plurality of barriers carried by said support to yieldably engage the inner peripheral surface of the workpiece and impede circumferential fluid flow around the workpiece.

7. In a rotatable support to carry an annular workpiece for a machining operation on the external peripheral surface thereof, an abutment surface to engage one end of the workpiece for rotation thereof, a support surface in registration with a workpiece engaged with said abutment surface and encircling with clearance the inner peripheral surface of said workpiece, said support surface having a plurality of angularly spaced openings therein for the discharge of fluid under pressure, and a plurality of barriers mounted within said support and extendable from said support surface at equally angular spaced points for yieldable engagement with the inner peripheral surface of the workpiece to define discrete fluid pressure zones around the workpiece.

8. In a rotatable chuck to drive an annular workpiece for a machining operation on the external peripheral surface of the workpiece, a face plate to slidably engage one end of the workpiece for rotation thereof, a stud portion inside a workpiece engaged with said face plate, said stud portion having a longitudinal axis and having an external support surface of circular cross-section centric with respect to said axis of and smaller diameter than the diameter of the inner peripheral surface of the workpiece to define a gap therewith, a plurality of diaphragms mounted in said stud portion to extend from said support surface at equally angularly spaced points about said axis and yieldably engage the inner peripheral surface of the workpiece, said diaphragms dividing said gap into discrete portions of equal circumferential span around said support axis, and a plurality of fluid passages in said stud portion terminating at openings in said support surface to develop fluid pressure forces in said gap portions tending to center said workpiece with respect to said support axis.

9. In a machine for grinding the outer peripheral surface of an annular workpiece, said workpiece having a groove in the inner peripheral surface thereof, the combination comprising a rotatable chuck having a magnetic face plate to slidably engage one end of the workpiece for rotation thereof, a stud portion on said chuck inside a workpiece engaged with said face plate, said stud portion having a longitudinal axis and having an external support surface of circular cross-section centric with respect to said axis and of smaller diameter than the diameter of the inner peripheral surface of the workpiece to define an annular gap therewith of equal radial span around the workpiece when the workpiece is centered with respect to said axis, said stud portion having a plurality of fluid passages terminating at openings in the support surface, some of said passages having an elastic diaphragm therein and the other of said passages constrictive to define resistance to fluid flow, said diaphragms extendable upon the application of fluid pressure to the diaphragm passages into said groove in the inner peripheral surface of the workpiece for yieldable engagement with the workpiece, said diaphragm passages equally angularly spaced around said support passage and said diaphragms when extended dividing the groove into pockets of equal circumferential span around said support axis, each of said pockets in communication with at least one of said other openings in the support surface for the application of fluid pressure forces to the inner peripheral surface of the workpiece to center said workpiece with respect to said support axis.

10. In a support to carry an annular workpiece for a machining operation on the internal peripheral surface thereof, an abutment surface to engage one end of the workpiece, a support surface in registration with a workpiece engaged with said abutment surface and encircling with clearance the outer peripheral surface of said workpiece, said support surface having a plurality of angularly spaced openings therein for the discharge of fluid under pressure, and a plurality of barriers carried by said support to yieldably engage the outer peripheral surface of the workpiece and impede circumferential fluid flow around the workpiece.

11. In a rotatable support to carry an annular workpiece for a machining operation on the internal peripheral surface thereof, an abutment surface to engage one end of the workpiece for rotation thereof, a support surface in registration with a workpiece engaged with said abutment surface and encircling with clearance the outer peripheral surface of said workpiece, said support surface having a plurality of angularly spaced openings therein for the discharge of fluid under pressure, and a plurality of barriers mounted within said support and extendable from said support surface at equally angular spaced points for yieldable engagement with the outer peripheral surface of the workpiece to define discrete fluid pressure zones around the workpiece.

12. In a rotatable chuck to drive an annular workpiece for a machining operation on the internal peripheral surface of the workpiece, a face plate to slidably engage one end of the workpiece for rotation thereof, a rim portion surrounding a workpiece engaged with said face plate, said rim portion having a longitudinal axis and having an internal support surface of circular cross-section centric with respect to said axis and of greater diameter than the diameter of the outer peripheral surface of the workpiece to define a gap therewith, a plurality of diaphragms mounted in said rim portion to extend from said support surface at equally angularly spaced points about said axis and yieldably engage the outer peripheral surface of the workpiece, said diaphragms dividing said gap into discrete portions of equal circumferential span around said support axis, and a plurality of fluid passages in said rim portion terminating at openings in said support surface to develop fluid pressure forces in said gap portions tending to center said workpiece with respect to said support axis.

13. In a machine for grinding the inner peripheral surface of an annular workpiece, said workpiece having a groove in the outer peripheral surface thereof, the combination comprising a rotatable chuck having a magnetic face plate to slidably engage one end of the workpiece for rotation thereof a rim portion on said chuck surrounding a workpiece engaged with said face plate, said rim portion having a longitudinal axis and having an internal support surface of circular cross-section centric with respect to said axis and of greater diameter than the diameter of the outer peripheral surface of the workpiece to define an annular gap therewith of equal radial span around the workpiece when the workpiece is centered with respect to said axis, said rim portion having a plurality of fluid passages terminating at openings in the support surface, some of said passages having an elastic diaphragm therein and the other of said passages constrictive to define resistance to fluid flow, said diaphragms extendable upon the application of fluid pressure to the diaphragm passages into said groove in the outer peripheral surface of the workpiece for yieldable engagement with the workpiece, said diaphragm passages equally angularly spaced around said axis and said diaphragms when extended dividing the groove into pockets of equal circumferential span around said support axis, each of said pockets in communication with at least one of said other openings in the support surface for the application of fluid pressure forces to the outer peripheral surface of the workpiece to center said workpiece with respect to said support axis.

References Cited by the Examiner
UNITED STATES PATENTS

| | | | |
|---|---|---|---|
| 2,530,615 | 11/50 | Hutto | 51—290 |
| 2,706,369 | 4/55 | Dix | 51—236 |
| 2,715,304 | 8/55 | Dix | 51—236 |
| 2,723,499 | 11/55 | Dix | 51—236 X |
| 2,753,388 | 7/56 | Bjerkas | 269—22 X |
| 2,754,641 | 7/56 | Bidwell | 51—236 |
| 2,784,534 | 3/57 | Townsend et al. | 51—237 |
| 2,826,420 | 3/58 | Klingler | 269—22 X |
| 2,924,917 | 2/60 | Rice | 51—237 |
| 2,927,406 | 3/60 | Terp | 51—236 |
| 2,965,384 | 12/60 | Lowe | 269—22 X |
| 2,981,037 | 4/61 | Terp | 51—237 |
| 3,040,486 | 6/62 | Balsiger | 51—236 |
| 3,056,238 | 10/62 | Hahn | 51—103 |

LESTER M. SWINGLE, *Primary Examiner.*

JOHN C. CHRISTIE, *Examiner.*